United States Patent
Schulz et al.

(10) Patent No.: US 9,453,518 B2
(45) Date of Patent: Sep. 27, 2016

(54) PROPORTIONAL PRESSURE-REGULATING VALVE

(75) Inventors: Frank Schulz, Blieskastel-Bierbach (DE); Peter Bruck, Althornbach (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 116 days.

(21) Appl. No.: 13/261,704

(22) PCT Filed: Jan. 7, 2012

(86) PCT No.: PCT/EP2012/000050
§ 371 (c)(1),
(2), (4) Date: Sep. 20, 2013

(87) PCT Pub. No.: WO2012/104005
PCT Pub. Date: Aug. 9, 2012

(65) Prior Publication Data
US 2014/0007964 A1    Jan. 9, 2014

(30) Foreign Application Priority Data

Feb. 5, 2011    (DE) .................. 10 2011 010 474

(51) Int. Cl.
| | |
|---|---|
| F16K 11/065 | (2006.01) |
| F15B 13/043 | (2006.01) |
| G05D 16/20 | (2006.01) |

(52) U.S. Cl.
CPC .......... F15B 13/043 (2013.01); G05D 16/2013 (2013.01); *Y10T 137/8671* (2015.04); *Y10T 137/86614* (2015.04)

(58) Field of Classification Search
CPC .......... F16K 31/0693; F16K 31/0603; G05D 16/2013; F15B 13/047; Y10T 137/8671; Y10T 137/86614; Y10T 137/86574; Y10T 137/8667; Y10T 167/86694; Y10T 137/86702

USPC ........... 137/625.68, 625.69, 625.67, 625.25, 137/625.2; 251/33, 37

See application file for complete search history.

(56) References Cited

U.S. PATENT DOCUMENTS 5,217,047 A * 6/1993 McCabe ................. 137/625.61
6,029,682 A * 2/2000 Lewis et al. ............. 251/129.19
(Continued)

FOREIGN PATENT DOCUMENTS

| | | |
|---|---|---|
| DE | 691 11 628 T2 | 5/1996 |
| DE | 199 53 209 A1 | 6/2001 |

(Continued)

OTHER PUBLICATIONS

Rausch and Pausch GmbH, Machine Translation of DE102006039488, Mar. 8, 2007, [retrieved from Espacenet.com on Jan. 22, 2015] all pages.*

*Primary Examiner* — Craig J Price
(74) *Attorney, Agent, or Firm* — Wenderoth, Lind & Ponack, L.L.P.

(57) ABSTRACT

A proportional pressure-regulating valve (1) includes a valve housing (3) having pump, utility and tank connections (P, A, T). A regulating piston (5) is longitudinally displaceable within the valve housing (3) to selectively connect the pump connection (P) to the utility connection (A) and the utility connection (A) to the tank connection (T) and is controllable by a magnetic coil device (7). The regulating piston (5) has a surface ratio (9) such that pressure on the utility connection (A) generates a counter force ($F_G$) against the magnetic force ($F_M$) of the magnetic coil device (7), moving the regulating piston (5) back and causing reduction of pressure medium from the pump connection (P) to the utility connection (A) until the pressure acting on the utility connection (A) corresponds to the magnetic force ($F_M$) of the current signal applied to the magnetic coil device (7).

17 Claims, 3 Drawing Sheets

(56) References Cited

U.S. PATENT DOCUMENTS

| | | | | |
|---|---|---|---|---|
| 6,161,585 | A | * | 12/2000 | Kolchinsky .............. 137/625.65 |
| 6,286,535 | B1 | | 9/2001 | Harms et al. |
| 6,450,194 | B1 | * | 9/2002 | Wasson et al. ................ 137/351 |
| 7,950,416 | B2 | * | 5/2011 | Nakai et al. .............. 137/625.69 |
| 2002/0134444 | A1 | * | 9/2002 | Isobe ....................... 137/625.65 |

FOREIGN PATENT DOCUMENTS

| | | |
|---|---|---|
| DE | 10 2004 020 268 A1 | 11/2005 |
| DE | 10 2006 039488 A1 | 3/2007 |
| EP | 2 031 475 | 3/2009 |
| WO | WO 2004/109419 A1 | 12/2004 |
| WO | WO 2005/083542 | 9/2005 |

\* cited by examiner

PROPORTIONAL PRESSURE-REGULATING VALVE

FIELD OF THE INVENTION

The invention relates to a proportional pressure-regulating valve including a valve housing having at least three fluid-conducting connections, in particular a pump port, a utility port and a tank port. A regulating piston is guided in a longitudinally displaceable manner within the valve housing to selectively connect the pump port with the utility port and to connect the utility port with the tank port. The regulating piston is controllable by magnetic force through the use of a magnetic coil device to which current signals can be applied.

BACKGROUND OF THE INVENTION

U.S. Pat. No. 6,286,535 B1 discloses a proportional pressure-regulating valve conforming to its genre, having a pump port axially disposed in relation to the direction of displacement of a regulating piston within a valve housing. Fluid-conducting connections such as a utility port and a tank port are discharged transversely to the axial direction of displacement of the regulating piston into the valve housing and into an annular space delimited on one side by the valve housing, and on the other side by the regulating piston. Disposed in an axial direction between one end of the regulating piston and the valve housing is a damping chamber that is always connected with this annular space in a fluid-conducting manner by an aperture such that movements of the regulating piston in the valve housing are damped by the compensation device formed by the aperture. The proportional pressure-regulating valve disclosed shown is therefore able to significantly dampen sudden changes in the volumetric flow rate in terms of the effect of those changes on the hydraulic pilot control of the proportional pressure-regulating valve, for example in the case of a hydraulically controlled coupling or a similar load.

DE 44 42 085 C2 discloses an electromagnetically actuated proportional pressure-regulating valve having:
a valve body having at least one fluid inlet opening and one fluid outlet opening as well as a channel connecting the fluid inlet opening with the fluid outlet opening;
a valve piston housed in the valve body and disposed between the fluid inlet opening and the fluid outlet opening such that that piston can be actuated to open and close the channel, with the valve piston having a bore with a reduced diameter;
a piston disposed and enclosed in the valve body to form a pressure chamber, with the piston having a pilot valve disposed outside of the pressure chamber and with the pilot valve disposed such that it can be actuated to regulate the pressure in the pressure chamber;
a return channel formed by the piston between the pressure chamber and the fluid outlet opening; and
an electrical device having an electromagnetic coil and a core composed of a material generating an electromagnetic force to move the pilot valve of the piston.

U.S. Pat. No. 5,836,335 discloses a proportional pressure-regulating valve, in which a regulating piston has a device for limiting pressure peaks such as can occur at a load port of a load for actuating a hydraulically actuated coupling, for example.

To that end, in the case of a preferred embodiment of the known valve, a spring-loaded check valve is used in the regulating piston, which check valve can be connected to the load port by an annular space. A pressure threshold value can be predetermined for the proportional pressure-regulating valve to the effect that, in the case that the pressure threshold value is exceeded, a fluid-conducting connection between the annular space and a circumferential groove in the regulating piston is released. The annular space is constantly connected to a tank port.

In particular in the case of hydraulic actuators used to actuate clutches in a drive train, it is desirable to fill or drain their working chambers with pressurizing medium. In particular, a horizontal p-Q characteristic of the proportional pressure-regulating valves used to control the flow of pressurizing medium for the hydraulic actuators is advantageous. The known proportional pressure-regulating valves are affected with respect to their control behavior of the volumetric flow rate.

SUMMARY OF THE INVENTION

An object of the invention is to provide an improved proportional pressure-regulating valve, where its control behavior is unaffected by a volumetric flow rate and in particular, where its control behavior leads towards a horizontal p-Q characteristic.

This objective is basically achieved by a proportional pressure-regulating valve where the regulating piston is provided with a surface transformation, so that pressure that builds up at the utility port generates a counterforce to the magnetic force of the magnetic coil device. The magnetic coil device moves the regulating piston back such that an inflow of pressurizing medium from the pump port to the utility port is reduced long enough that the pressure at the utility port is equal to the magnetic force, and in this respect, to the preset pressure value by the respective current signal to the magnetic coil device.

The surface transformation is formed by active surfaces or pressure surfaces on the regulating piston. The active surfaces or pressure surfaces are acted upon by pressure that builds up at the utility port of the proportional pressure-regulating valve. An effect of dynamic pressure from the pressurizing medium flowing through the proportional pressure-regulating valve on the pertinent active surfaces pressure surfaces is thus at least largely eliminated. This structural measure results in an at least approximately horizontal p-Q characteristic of the volumetric flow rate of pressurizing mediums, which characteristic is desired.

In an especially preferred embodiment of the proportional pressure-regulating valve according to the invention, the active surfaces or pressure surfaces that form the surface transformation are formed by a difference in diameter (D-d) on the outer circumference of the regulating piston. The surface transformation is preferably formed as a step on the regulating piston. In each movement position of the regulating piston, the step is located in an axial direction of the valve housing between the utility port and the tank port.

The regulating piston has a longitudinal channel in its interior. Openings are disposed in the regulating piston passage and are suitable to at least partially establish a fluid-conducting connection between the longitudinal channel and the utility port, as well as the tank port. The passage openings in the regulating piston assigned to the utility port are formed by wall parts of the regulating piston. These wall parts, together with the wall parts of the valve housing, at least partially delimit the utility port and form a control edge for the supply and discharge of fluid to the utility port. The regulating piston is provided with an annular channel on its outer circumference in the axial region between the utility port and the pump port. The delimiting wall parts of the annular channel, in particular delimiting wall parts thereof when viewed in an axial direction, form a further control edge, at least in part with assignable wall parts of the valve housing that delimit the pump port. These structural measures permit separating the inflow of pressurizing medium from the pump port to the utility port, as well as the flow of pressurizing medium from the utility port to the tank port. Moreover, this structural measure permits tapping the static pressure at the utility port to impact the active surfaces or pressure surfaces that form the surface transformation.

The step on the regulating piston that forms the surface transformation is predominantly acted upon thereby by the "static" pressure of a pressurizing medium at the utility port of the proportional pressure-regulating valve. As a result, the longitudinal movement of the regulating piston in the valve housing is equalized and damped.

In an especially preferred embodiment of the proportional pressure-regulating valve, the step on the regulating piston is at least partially circular, preferably circular. In the case of a circular embodiment of the pertinent step, pressurization over the entire circumference of the step is possible, and not just in the tangential extension region of the utility port.

The damper throttle can be connected upstream of the step on the regulating piston in the manner of a relief groove, which groove is disposed between the wall parts of the regulating piston and the wall parts of the valve housing. The damper throttle is formed in the manner of a circumferential groove on the regulating piston. The circumferential groove forming the damper throttle has an asymmetrical cross-section to the extent that, when viewed in the axial direction from the utility port to the tank port, the radially-directed penetration depth of that cross-section gradually widens and then narrows, forming a steep groove flank and thus, the step on the regulating piston. A fluid annulus is thereby created by the damper throttle, with that annulus being located axially upstream from the step in relation to the inlet flow of pressurizing medium. The pertinent damper throttle represents a further especially advantageous structural measure such that the proportional pressure-regulating valve according to the invention generates a horizontal p-Q characteristic.

Because a flow of pressurizing medium is guided from the pump port to the utility port on the outside of the regulating piston in the annular channel between wall parts of the valve housing and wall parts of the regulating piston, pressurizing medium is prevented from flowing directly onto the step.

When viewed in an axial direction, the regulating piston is acted on by an actuator of the magnetic coil device on the one hand, and is supported on the side thereof that faces away from the magnetic coil device on an energy storage component on the other, preferably in the form of a compression spring. In an especially preferred embodiment of the proportional pressure-regulating valve, the free end of the energy storage component is then supported on an end piece of the valve housing. Advantageously, the energy storage component is disposed in a receiving space of the valve housing, which receiving space is connected with the longitudinal channel of the regulating piston by a media channel in a fluid-conducting manner. In this way, a simple design of the energy storage component is chosen. Additionally, a simple structure adapts the proportional pressure-regulating valve according to the invention to a predetermined pressure level and predetermined actuating forces dependent on the intended use of the proportional pressure-regulating valve in a hydraulic system. The media channel provides a simple way to form the receiving space of the energy storage component in a depressurized manner.

Advantageously, the regulating piston-valve housing has sealing devices on the outer circumference thereof so that the fluid-conducting connections of the proportional pressure-regulating valve are sealed between the outer wall of the valve housing and inner wall of a valve block into which the valve housing is inserted. The use of separate sealing devices permits increasing any manufacturing tolerances, in particular in reference to the radial fitting accuracy of the valve housing in the valve block. This increase in turn helps to reduce the manufacturing costs of the relevant proportional pressure-regulating valve as a whole. The utility port and the tank port of the proportional pressure-regulating valve are formed by at least two mutually different connection points, which points are each separated from one another by wall parts of the valve housing.

In an especially preferred embodiment, the entire proportional pressure-regulating valve is formed in the manner of a threaded cartridge screwable into the valve block. The valve block has fluid-conducting connections that interact with the fluid-conducting connections in the valve housing or that are connected thereto in a fluid-conducting manner. In this way, the proportional pressure-regulating valve is suited to being disposed in various functional sections of a hydraulic system in a space-saving manner. With the proportional pressure-regulating valve according to the invention, an at least approximately linear p-Q characteristic can be generated to the effect that the control pressure is maintained independent of the volumetric flow rate of pressurizing medium between the fluid-conducting connections of the proportional pressure-regulating valve.

The proportional pressure-regulating valve according to the invention thereby avoids all disadvantages of proportional pressure-regulating valves known from the prior art in respect to a non-linear behavior of the p-Q characteristic having such proportional pressure-regulating valves.

The proportional pressure-regulating valve according to the invention is especially suited to controlling the flow of pressurizing medium to a working chamber of a hydraulic load, which chamber is provided to control a coupling device for a drive of a machine, or for a drive system of a vehicle.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
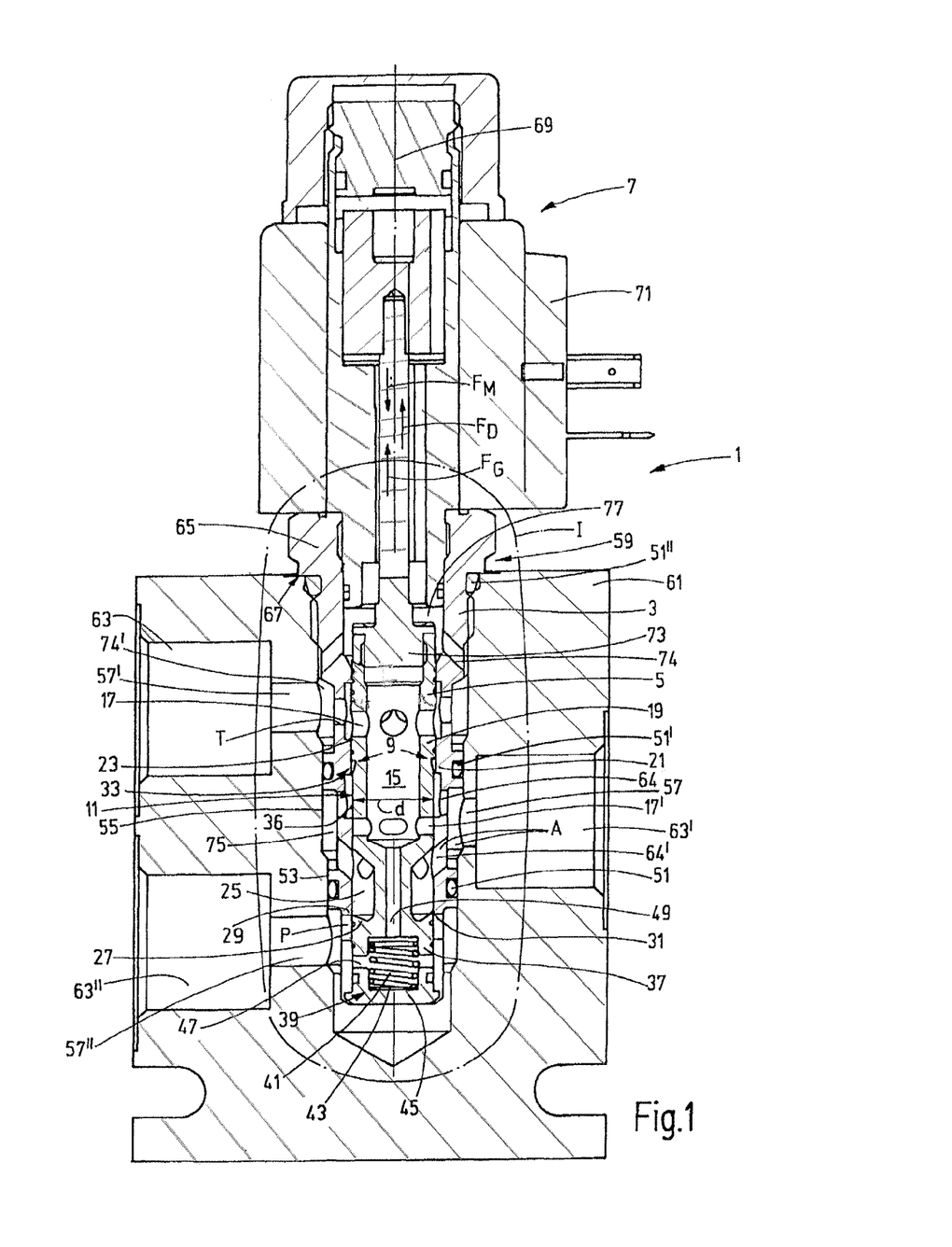
FIG. 1 is a side elevational view in section of a proportional pressure-regulating valve according to an exemplary embodiment of the invention in the form of a threaded cartridge solution.

FIG. 1 shows the proportional pressure-regulating valve 1 according to an exemplary embodiment of the invention with its essential parts in a longitudinal section view. It has a valve housing 3 that can be screwed into a valve block 61 or the like by a threaded section. The thin-walled valve housing 3 is provided with various changes in its bore in the manner of a hollow cylinder and has different fluid-conducting connections that extend circumferentially in a radial direction and from top to bottom as viewed in FIG. 1. These connections are a tank port T, a utility port A for supplying a pressurizing medium to a load (not discussed here further), and a pump port P for connecting a fluid supply (not discussed here further), for example in the form of a hydraulic pump, particularly a constant pump for conveying hydraulic oil. In addition, a regulating piston 5 is guided in a longitudinally displaceable manner within the valve housing 3 to selectively connect the pump port P with the utility port A, and to connect the utility port A with the tank port T.

Figure 2:
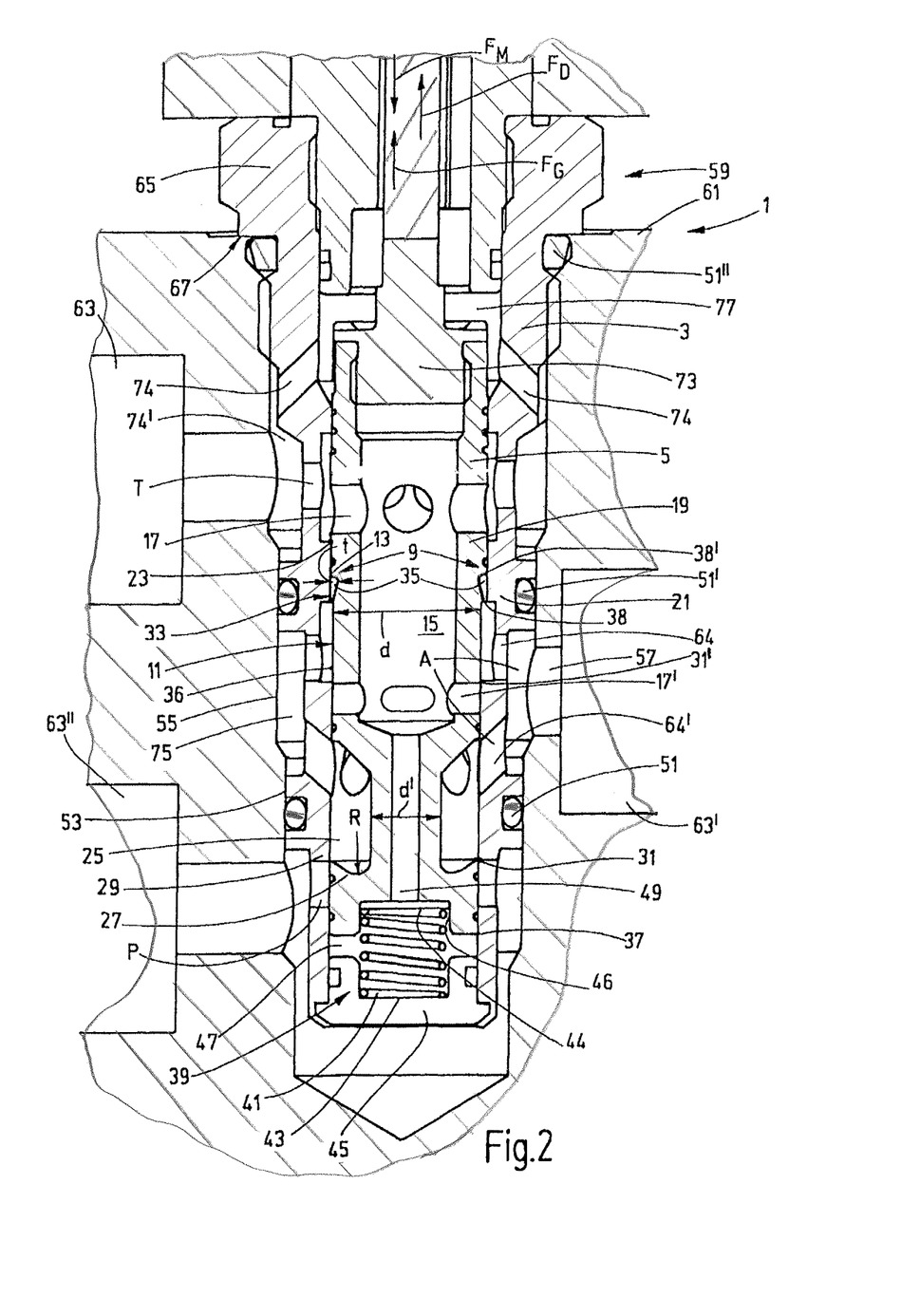
FIG. 2 and FIG. 2A are enlarged side elevational views in section of Section I in FIG. 1.
Figure 2A:
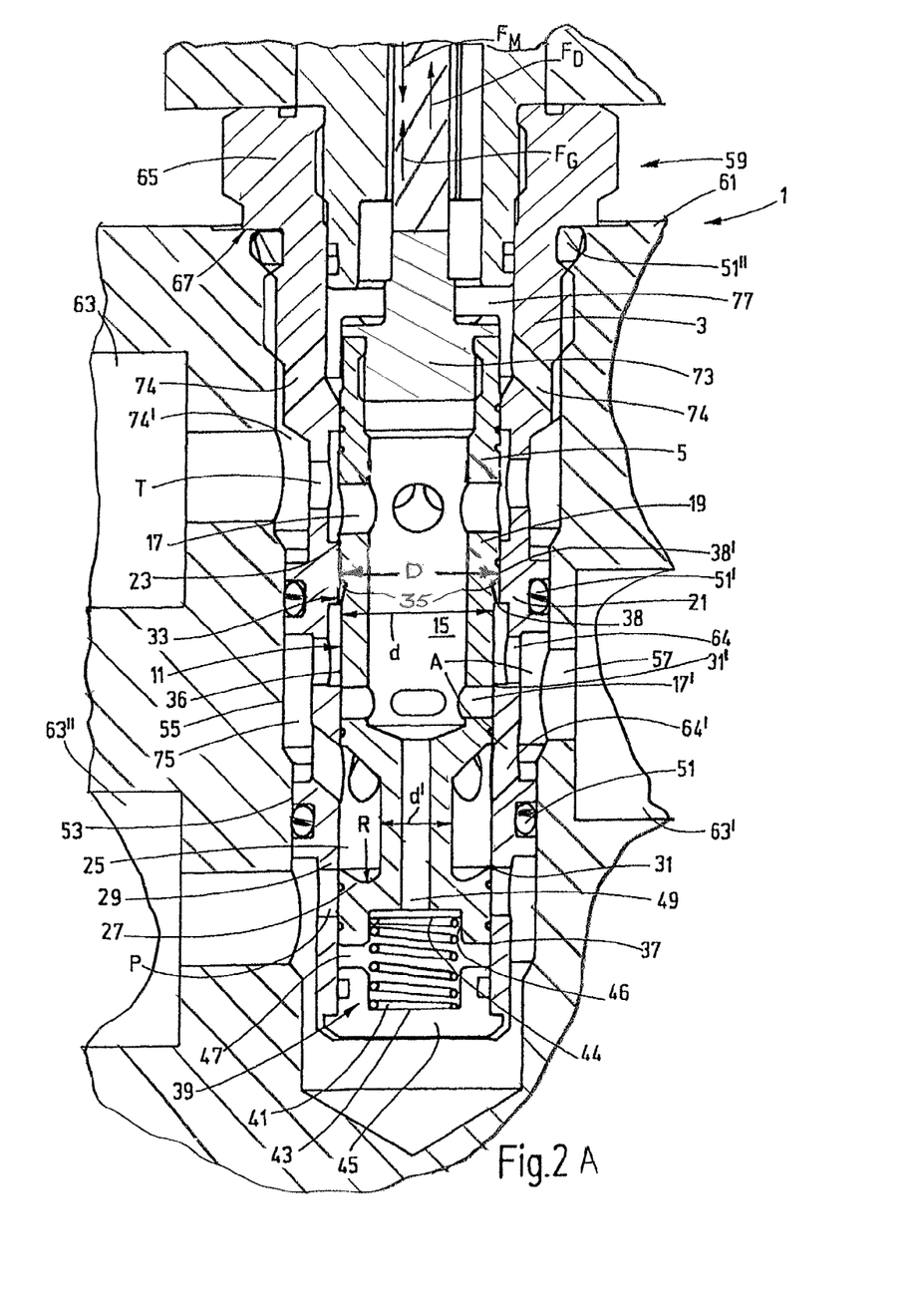

To establish a fluid-conducting connection between the respective fluid-conducting connections P, A and T, the regulating piston 5 can be controlled with the magnetic force $F_M$ of a magnetic coil device 7. Depending on the respective current supply, the magnetic coil device 7 thereby exerts a magnetic force $F_M$ in an axial direction on the regulating piston 5. The regulating piston 5 exhibits a surface transformation 9 on its outer circumference 11 in the form of a step 13 (see FIG. 2) formed by a change in diameter. To form step 13, a diameter d of the regulating piston 5 on the outer circumference of the regulating piston 5, which diameter the regulating piston has in the region of the utility port A thereof, widens to a diameter D (FIG. 2A) which the regulating piston 5 has in the region of the tank port T. This structure is made clearer in detail I in FIG. 2 showing an enlarged view. The jump in diameter, d to D, is relatively small in the embodiment shown, and amounts to 1/20 to 1/50 of the selected diameter d, for example. Viewed in the axial direction of the regulating piston 5, the step 13 is located in every movement position of the regulating piston 5 within the stationary valve housing 3 between the utility port A and the tank port T.

The regulating piston 5 also has a centrally disposed longitudinal channel 15 that extends along the axial extension of the regulating piston 5 between the tank port T and the pump port P. The regulating piston 5 also has radial passage openings 17 capable of establishing a fluid-conducting connection between the longitudinal channel 15 and the tank port T. In the embodiment shown, five passage openings 17 in the form of cylindrical through-holes have a tangential offset to one another and are disposed in the regulating piston 5, which regulating piston overall is formed as a hollow cylinder. In the direction of FIGS. 1 and 2, additional passage openings 17' in the form of transversal slotted holes with a 900 tangential offset to one another are disposed in the regulating piston 5 below these radial passage openings 17. The passage openings 17' form possible fluid-conducting connections between the longitudinal channel 15 and the utility port A. The passage openings 17', and in particular the wall parts 19, which parts also delimit the passage openings 17 in the regulating piston 5, interact with wall parts 21 of the valve housing 3, at least in part such that the free cross-section of the utility port A is delimited. The pertinent passage point 23 is in the housing between the tank port T and the utility port A in the housing. The supply and discharge of fluid from the pump port P to the utility port A takes place along the regulating piston 5 on the circumference thereof. For this purpose, the regulating piston 5 is narrowed from the outer diameter d to an outer diameter of approximately half that dimension d' (see FIG. 2) starting from the pump port end thereof. An annular channel 25 is thereby formed between the further wall parts 27 of the regulating piston 5 and the assignable further wall parts 29 of the valve housing 3, and together with the pump port P, a control edge 31 is formed by the specific longitudinal section profile of said valve housing 3 in the manner of a parallelogram. The control edge 31 controls the flow of pump fluid. A further control edge 31' controls the flow of fluid between the passage opening 17 and the utility port A. The annular channel 25 is designed having a correspondingly large overall length in an axial direction to achieve flow force compensation. Starting from the control edge 31, a statically longer lasting flow is thus achieved in a favorable manner.

While the flow of pressurizing medium is thereby guided from the pump port P to the utility port A on the circumference of the regulating piston 5, the flow of pressurizing medium is guided, starting from the utility port A, to the tank port T, primarily inside the regulating piston 5 via the longitudinal channel 15 thereof. A "dynamic" pressure within the regulating piston 5 is thereby exerted in the axial region between the utility port A and the tank port T; while in the axial region between the pump port P and the utility port A, the dynamic pressure or velocity head of the flow of fluid is exerted outside the regulating piston 5. This constructive measure allows for nearly exclusively "static" pressure to be exerted on the surface transformation 9 or the step 13 forming this surface transformation, the static pressure currently being at the utility port A. The step 13 on the regulating piston 5 forming the surface transformation 9 is annular in the embodiment shown. Advantageously, the step 13 may have only one cross-section shaped like a circular segment or circular disk cutout.

Moreover, FIG. 2 shows in particular that a type of damper throttle 33 can be connected upstream from the step 13 in the form of a circumferential groove 35 in the regulating piston 5. The pertinent circumferential groove 35 has a symmetrical cross-section characterized by an increasing penetration depth t, starting from the edge 38 of the circumferential groove 35 facing the utility port A and ending at a steep opposing edge 38' forming the step 13. The fluid pressure of the utility port being applied to the outside 36 of the regulating piston 5 is therefore able to indirectly flow against the step 13 via the throttle 33. In this respect, the "static" pressure at the utility port A exerts a counterforce $F_G$ opposing the magnetic force $F_M$ on the step 13. A compression force $F_D$ from an energy storage component 39 in the form of a compression spring 41 must be added to this counterforce $F_G$. The free end 43 of the pertinent energy storage component 39 in the form of the compression spring 41 is supported on an axial end piece 45 of the valve housing 3. The spring free end 44 is supported on an end-side recess 46 in the regulating piston 3. The end piece 45 is hereby shown as a cup-shaped cap with a flanged edge delimited in the edge region thereof by wall parts of the valve housing 3. In this case, the energy storage component 39 extends into a receiving space 47 of the valve housing 3. The wall parts of the receiving space 47 serve as a guide in which the lower front end 37 of the regulating piston 5 slides.

Like the end piece 45, the regulating piston 5 is also cup-shaped on the front end 37 thereof facing the end piece 45, so that the compression spring 41 is axially and radially guided into the respective components 45 and 5. Reliable centering of the compression spring 41 along the entire travel length of the regulating piston 5 is then provided. For the purpose of pressure equalization, the receiving space 47 is connected to the remaining longitudinal channel 15 of the regulating piston 5 fluid-conducting by a cylindrical media channel 49 as part of a longitudinal channel 15. The media channel 49 extends axially and centrally in the regulating piston 5. Due to the thin width or small internal diameter of the media channel 49, and the not insignificant axial extension thereof, the media channel 49 can also contribute fundamentally to damping the movement of the regulating piston 5.

As shown in the embodiment, two circumferential grooves for receiving sealing devices 51, 51' are formed at a distance from one another on the outer circumference of the valve housing 3 that accommodates the regulating piston 5. The sealing devices 51, 51' in the embodiment shown are formed as O-rings made of an elastomer material. A further sealing device 51", adjacent to the magnetic coil device 7, is adjacently disposed on a hexagonal bolt 65, formed as an integral part of the valve housing 3 for screwing the valve housing 3 into the valve block 61. When the proportional pressure-regulating valve 1 is in an assembled state, the sealing device 51" is fixed in axial and radial directions between the pertinent hexagonal bolt 65 and, in particular, between an axial flange face 67 on the hexagonal bolt 65 and the valve block 61. Overall, the sealing devices 51, 51', 51" form structural measures for separating the fluid-conducting connections P, T and A between the outside 53 of the valve housing 3 and an inner face 55 of the valve block 61. The utility port A as well as the tank port T and the pump port P are separated from one another by three separated connection points 57, 57', 57" (see FIG. 1). As shown, the valve block 61 has fluid guides 63, 63', 63" formed in the manner of step-shaped blind holes. The fluid guides each are connected with the fluid-conducting connections T, A and P in the valve housing 3 in a fluid-conducting manner. To that end, the axial cross-sectional shape of the valve housing 3, formed as a threaded cartridge 59, is adapted to the positions of the pertinent fluid guides 63, 63', 63".

In addition to the surface transformation 9 according to the invention, which surface transformation otherwise eliminates the need for the elaborately shaped pilot control devices of known valves, an advantageous feature of the proportional pressure-regulating valve 1 according to the invention is the distribution of the pressurizing medium supply and discharge to and from the passage openings 64', 64 in the valve housing 3 leading to and away from utility port A into two rows of passage openings 64', 64 disposed above one another in a circumferential distribution on the valve housing 3. In the direction of FIGS. 1 and 2, the lower passage openings 64' are formed as cylindrical through-holes oriented radially and perpendicular to the longitudinal axis 69 of the valve in the form of an approximately 45° through-hole, which through-hole is upwardly oriented relative to the longitudinal axis 69 of the valve and the respective upper passage openings 64.

Due to the oblique orientation of the lower through-holes 64' towards the outflow opening 57 of the valve block 61 with respect to the utility port A, a low pressure-loss inflow of pressurizing medium to the utility port A is made possible. In addition, the greatest possible separation of the "dynamic" pressure prevailing in the pertinent passage opening 64' from a "static" pressure prevailing in the upper passage opening 64 is effected, provided the utility port A is connected with the pump supply port P and a corresponding supply pressure is in port P. Both passage openings 64 and 64' open into a widened annular channel 75 extending along the outer circumference of the valve housing 3 and by the utility port A having a fluid-conducting connection to the upper passage opening 64. Upper passage opening, controlled by the regulating piston 5, releases the fluid flow to the tank port T.

To allow fluid to flow into the annular channel 25 with a low loss of pressure, the wall parts 27 of the regulating piston 5, adjacent to the annular channel and oriented in an axial direction towards the energy storage component 39, have inlet flow radius R. When the control edge 31 is activated, the fluid-pressurizing medium flowing into the annular channel 25 then has a greater turning radius available. The pressurizing medium can then subsequently flow upward, axially into the annular channel 25 and through the lower passage opening 64' in the valve housing 3, toward the utility port A.

The magnetic coil device 7 shown in FIG. 1 is constructed in the manner of a proportional magnet system. Pertinent magnet systems regularly have a coil winding to be subjected to an electrical current (not shown). The magnet system therefor is equipped with a plug connection 71 (see FIG. 1) having a plug that projects radially from the proportional pressure-regulating valve. When the magnetic coil device 7 is subjected to an electrical current, an actuating plunger 73 (see FIG. 2) is controlled by a coil winding (not discussed here further) such that, when viewed as in FIG. 1, this actuating plunger carries out a downward movement and moves the regulating piston 5 connected therewith downward in the valve housing 3 thereby. The pertinent structure of a magnetic system or a magnetic coil device 7 and its operation is known in the prior art.

A diagonal penetration channel 74 is provided for pressure equalization behind the regulating piston 5 when it is in motion. The channel 74 extends through the valve housing 3 at approximately 45° to the longitudinal axis 69, leading from an annular channel 74' between the valve housing 3 and the valve block 61 to a fluid chamber 77 behind the regulating piston 5. The annular channel 74' is disposed in the axial region of the fluid guide 63 for the tank port T in the valve block 61 and encompasses the entire circumference of the valve housing 3.

Now that the structural design of the proportional pressure-regulating valve 1 according to the invention has been described in terms of its essential features, a functional description follows to provide a better understanding. The sequence of a control process with the proportional pressure-regulating valve 1 is provided as an example.

If the magnetic coil device 7 is not subjected to an electrical current, no pressurizing medium can flow into the valve housing 3 from the pump port P due to the position of the regulating pistons as shown in FIGS. 1 and 2. The regulating piston 5 is centered and raised when viewed in an upward direction from the energy storage component 39. The compression spring 41 is in the maximum lengthened position thereof. In the event that current is applied to the magnetic coil device 7 by upstream electronics (not shown), the regulating piston 5, which is formed in the manner of a piston pilot unit, moves downward when viewed as in FIGS. 1 and 2, wherein the wall parts 27 that axially delimit the bottom of the annular channel 25 overlap the wall parts 29 of the valve housing 3 on the exterior. Pressurizing medium can thereby flow into the annular channel 25 coming from the pump port P. The inflow is then controlled through the use of the further control edge 31 of the regulating piston 5.

Here, the lower passage openings 64' remain, at least partially, in an opened position, so that the pressurizing medium can again exit the valve housing 3 through the passage openings 64' and flow into the utility port A. The inflow of the pressurizing medium into the utility port A takes place via an annular channel 75 formed in an axial region of the utility port A between the valve block 61 and the outside of the valve housing. Static pressure from the pressurizing medium is guided thereby from the utility port A, via the upper passage openings 64 in the valve housing 3 to the regulating piston 5 and via the damper throttle 33 to the step 13, whereby a counterforce $F_G$, to the magnetic force $F_M$ generated by the magnetic coil device 7, is generated. Together with the compression force $F_D$ generated by the compression spring 41, a regulating equilibrium of the aforementioned forces is thereby established. In this way, the regulating piston 5 assumes a proportional regulating position in accordance with the prevailing balance of forces.

As the "static" pressure at the step 13 decreases, the free cross-section of the pump port P thereby increases by activating the further control edge 31 by the magnetic force $F_M$, and the volumetric flow rate of the pressurizing medium from the pump port P to the utility port A increases. Insofar as the "static" pressure at the passage openings 64 increases in the region of the upper utility port A, the counterforce $F_G$ increases so that the regulating piston 5 again reaches an increasingly closed position in relation to the pump port P, in that the further control edge 31 approaches it. If the "static" pressure at the utility port A falls below a nominal pressure setting due to a load removal from a load connected thereto, the actuating plunger 73 pushes the regulating piston 5 back down under the effect of the magnetic force $F_M$ and the described control process begins again. Excess quantities of fluid on the load side are passed on from the utility or load port A to the tank port T though the control of the first control edge 23 by the regulating piston 5 and in this respect, discharged from the regulatory system into a fluid circuit (not shown) connected to the valve.

The flow guidance of the pressurizing medium from the pump port P to the utility port A, and from the utility port A to the tank port T according to the invention results in a largely turbulence-free and quieted flow of pressurizing medium to the regulating piston 5. The desired linear p-Q characteristic can be achieved by the valve according to the invention. No hydraulic pump must be connected to the pump port P, but instead any form of suitable pressure supply with fluid is sufficient for the regulatory approach according to the invention being addressed.

While one embodiment has been chosen to illustrate the invention, it will be understood by those skilled in the art that various changes and modifications can be made therein without departing from the scope of the invention as defined in the appended claims.

What is claimed is:

1. A proportional pressure-regulating valve, comprising:
a valve housing having at least a pump port, a utility port and a tank port in said valve housing;
a regulating piston movably guided longitudinally in said valve housing selectively to connect said pump port with said utility port and to connect said utility port with said tank port, said regulating piston having an outer circumference;
a magnetic coil device mechanically coupled to and controlling movement of said regulating piston such that said regulating piston and said magnetic coil device move together in said valve housing by a magnetic force, said magnetic coil device generating the magnetic force when electrical current signals are applied to said magnetic coil device; and
a surface transformation on said regulating piston that builds up pressure at said utility port and generates a counterforce opposing the magnetic force of said magnetic coil device to move said regulating piston back such that an inflow of pressurizing medium from said pump port to said utility port is reduced long enough that pressure at said utility port is equivalent to the magnetic force and to a preset pressure value representative of the current signals applied to said magnetic coil device, said surface transformation being formed by different diameters on said outer circumference of said regulating piston to form a step on said regulating piston, said step extending between said utility port and said tank port in each movement position of said regulating piston.

2. A proportional pressure-regulating valve according to claim 1 wherein
said regulating piston comprises a longitudinal channel and first and second passage openings extending into said longitudinal channel forming at least partially fluid-conducting connections between said longitudinal channel and said utility port and said tank port, said first passage opening being connected to said utility port with piston wall parts of said regulating piston and housing wall parts of said valve housing at least in part delimiting said utility port, said first passage opening forming a first control edge for supply and discharge of fluid to said utility port.

3. A proportional pressure-regulating valve according to claim 2 wherein
said energy storage component extends into a receiving space of said valve housing, said receiving space being connected in fluid communication with said longitudinal channel in said regulating piston through a media channel.

4. A proportional pressure-regulating valve according to claim 1 wherein
said regulating piston has an annular channel on said outer circumference of said regulating piston between said utility port and said pump port; and
delineating wall parts of said annular channel form a second control edge with wall parts of said valve housing delimiting said pump port.

5. A proportional pressure-regulating valve according to claim 1 wherein
said step on said regulating piston is in fluid communication with said utility port to be acted upon by pressure of the pressurizing medium at said utility port.

6. A proportional pressure-regulating valve according to claim 1 wherein
said step on said regulating piston is at least partially circular.

7. A proportional pressure-regulating valve according to claim 1, wherein
a damper throttle is connected upstream of said step on said regulating piston and is disposed between wall parts of said regulating piston and wall parts of said valve housing.

8. A proportional pressure-regulating valve according to claim 7 wherein
said damper throttle is formed by a widening circumferential groove in said regulating piston, said circumferential groove having an asymmetrical cross section in a radially-directed depth of said circumferential groove relative to an axial direction from said utility port to said tank port and forming said step on said regulating piston.

9. A proportional pressure-regulating valve according to claim 1 wherein
wall parts of said valve housing and wall parts of said regulating piston define a flow guide for the pressurizing medium from said pump port to said utility port on an outside of said regulating piston.

10. A proportional pressure-regulating valve according to claim 1 wherein
said regulating piston is supported at an end of said regulating piston remote from said magnetic coil device on an energy storage component.

11. A proportional pressure-regulating valve according to claim 10 wherein
said energy storage component comprises a compression spring.

12. A proportional pressure-regulating valve according to claim 10 wherein
said energy storage component comprises a first free end supported on an end piece of said valve housing and a second free end supported on said regulating piston.

13. A proportional pressure-regulating valve according to claim 1 wherein
said valve housing is inserted in a valve block; and
said valve housing comprises seals of an outer surface of said valve housing separating said pump port, said utility port and said tank port between outer walls of said valve housing and an inner face of said valve block.

14. A proportional pressure-regulating valve according to claim wherein
said utility port and said tank port comprise at least two mutually different connection points separated from one another by wall parts of said valve housing.

15. A proportional pressure-regulating valve according to claim 1 wherein
said valve housing with said regulating piston therein comprises a threaded cartridge threaded into a valve block, said valve block having fluid-conducting connections in fluid communication with said pump port, said utility port and said tank port, respectively.

16. A proportional pressure-regulating valve according to claim 1 wherein
said valve housing and said regulating piston maintaining control pressure independent of volumetric flow rate of the pressurizing medium between said pump port, said utility port and said tank port.

17. A proportional pressure-regulating valve according to claim 1 wherein
said valve housing and said regulating piston are connectable to and able to control flow of the pressurizing medium to a working chamber of a hydraulic load for controlling one of a coupling device for a machine drive or a vehicle drive system.

* * * * *